(12) United States Patent
Sheem et al.

(10) Patent No.: US 9,093,711 B2
(45) Date of Patent: Jul. 28, 2015

(54) ACTIVE MATERIAL INCLUDING A THIN FILM GRAPHITE LAYER AND RECHARGEABLE LITHIUM BATTERY

(75) Inventors: Kyeu-Yoon Sheem, Yongin-si (KR); Sumihito Ishida, Yongin-si (KR); Eui-Hwan Song, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 136 days.

(21) Appl. No.: 12/929,565

(22) Filed: Feb. 1, 2011

(65) Prior Publication Data

US 2012/0034522 A1 Feb. 9, 2012

(30) Foreign Application Priority Data

Aug. 9, 2010 (KR) .................. 10-2010-0076616

(51) Int. Cl.
*H01M 4/60* (2006.01)
*H01M 4/583* (2010.01)
*H01M 4/62* (2006.01)
*H01M 4/587* (2010.01)
*H01M 4/48* (2010.01)
*H01M 4/40* (2006.01)
*H01M 4/13* (2010.01)
*H01M 10/052* (2010.01)

(52) U.S. Cl.
CPC .............. *H01M 4/625* (2013.01); *H01M 4/13* (2013.01); *H01M 4/405* (2013.01); *H01M 4/48* (2013.01); *H01M 4/587* (2013.01); *H01M 10/052* (2013.01); *Y02E 60/122* (2013.01)

(58) Field of Classification Search
CPC ....... H01M 4/405; H01M 4/48; H01M 4/587; H01M 4/13; H01M 4/625; H01M 10/052; H01M 4/133; H01M 4/134; H01M 4/136; H01M 4/139; H01M 4/38
USPC .............. 429/188, 231.8, 232, 231.95, 231.2; 252/182.1
See application file for complete search history.

(56) References Cited

U.S. PATENT DOCUMENTS

| | | | |
|---|---|---|---|
| 2002/0009646 A1* | 1/2002 | Matsubara et al. | ........ 429/231.8 |
| 2005/0164090 A1 | 7/2005 | Kim et al. | |
| 2007/0087268 A1* | 4/2007 | Kim et al. | ..................... 429/232 |
| 2008/0220329 A1 | 9/2008 | Kojima et al. | |
| 2009/0117467 A1 | 5/2009 | Zhamu et al. | |
| 2009/0123850 A1 | 5/2009 | Takeuchi et al. | |
| 2010/0092809 A1* | 4/2010 | Drzal et al. | ..................... 429/12 |
| 2010/0143798 A1* | 6/2010 | Zhamu et al. | ................. 429/212 |
| 2011/0193014 A1 | 8/2011 | Sotowa et al. | |

FOREIGN PATENT DOCUMENTS

| KR | 10 2005-0077079 A | 8/2005 |
|---|---|---|
| KR | 10 2008-0022494 A | 3/2008 |
| KR | 10-2008-0031223 A | 4/2008 |

(Continued)

OTHER PUBLICATIONS

"Improved Graphite Anode for Lithium-Ion Batteries", Peled et al., J Electrochem. Soc., vol. 143, No. 1, Jan. 1996, L4-L7.*

(Continued)

*Primary Examiner* — Kenneth Douyette
(74) *Attorney, Agent, or Firm* — Lee & Morse, P.C.

(57) ABSTRACT

An active material for a rechargeable lithium battery and a rechargeable battery, the active material including an active material core; and a thin film graphite layer on the core.

19 Claims, 2 Drawing Sheets

(56) References Cited

FOREIGN PATENT DOCUMENTS

| KR | 10 2008-0040049 A | 5/2008 | |
|---|---|---|---|
| KR | 10-0834054 B1 | 5/2008 | |
| KR | 1020080112809 A1 * | 12/2008 | ............ C01D 15/00 |

OTHER PUBLICATIONS

"Chemical Oxidation: A Route to Enhanced Capacity in Li-Ion Graphite Anodes", Ein-Eli et al., J Electrochem. Soc., vol. 144, No. 9, Sep. 1997, 2968-2972.*

Machine Translation of: KR 1020080112809 A1, Lee et al., Dec. 26, 2008.*

"Graphene nanosheets for enhanced lithium storage in lithium ion batteries", Wang et al., Carbon, vol. 47, Issue 8, Jul. 2009, pp. 2049-2053.*

"Characterization of Electrodes for Lithium-Ion Batteries through Electrochemical Impedance Spectroscopy and Mass Spectrometry", Fabio La Mantia, Universita degli Studi di Palermo, p. 1-10, 2008.*

"New Graphene Nanomaterial Could Result in More Fuel-Efficient Airplanes and Cars; Applications in Energy Storage", Lawrence Drzal, Green Car Congress, Jul. 31, 2009. Retrieved online on Dec. 9, 2013 from: http://www.greencarcongress.com/2009/07/xgnp-20090731.html.*

"Synthesis of hybrid graphene carbon-coated nanocatalysts", Zhanwei et al., Journal of Materials Chemistry, Jul. 8, 2010, p. 8320-8232.*

Korean Office Action in KR 10-2010-0076616, dated Dec. 19, 2011 (Sheem, et al.).

Korean Notice of Allowance in KR 10-2010-0076616, dated Jul. 31, 2012 (Sheem, et al.).

* cited by examiner

ACTIVE MATERIAL INCLUDING A THIN FILM GRAPHITE LAYER AND RECHARGEABLE LITHIUM BATTERY

BACKGROUND

1. Field

Embodiments relate to an active material for a rechargeable lithium battery and a rechargeable lithium battery including the same.

2. Description of the Related Art

Lithium rechargeable batteries have recently drawn attention as a power source for small portable electronic devices. Lithium rechargeable batteries may use an organic electrolyte solution. Thus, they may have twice the discharge voltage of conventional batteries using an alkali aqueous solution, and, accordingly may have high energy density.

Positive active materials for a rechargeable lithium battery may include lithium-transition element composite oxides capable of intercalating lithium, e.g., $LiCoO_2$, $LiMn_2O_4$, $LiNi_{1-x}Co_xO_2$ ($0<x<1$), and so on.

Negative active materials may include diverse carbon-based materials capable of intercalating/deintercalating lithium, e.g., artificial graphite, natural graphite, and hard carbon, or lithium composite compounds, e.g., a metal-based material including Si or a lithium vanadium oxide.

SUMMARY

Embodiments are directed to an active material for a rechargeable lithium battery and a rechargeable lithium battery including the same.

At least one of the above and other features and advantages may be realized by providing an active material for a rechargeable lithium battery, the active material including an active material core; and a thin film graphite layer on the core.

The thin film graphite layer may have a thickness of about 10 nm to about 2 μm.

The thin film graphite layer may include graphene.

The thin film graphite layer may be included in an amount of about 5 wt % or less, based on a total weight of the active material.

The thin film graphite layer may be included in an amount of about 0.1 wt % to about 5 wt %, based on a total weight of the active material.

The thin film graphite layer may include an oxygen containing hydrophilic functional group, the oxygen containing hydrophilic functional group being bound at a surface of the thin film graphite layer.

The oxygen containing hydrophilic functional group may include a carboxyl (COOH) group, a carbonyl (CO) group, a hydroxyl (OH) group, an aldehyde (CHO) group, a phenol group, a lactone group, an oxo group (O═) group, a carboxyl anhydride group, a peroxide group, or a combination thereof.

The active material may have an average particle diameter of about 5 μm to about 50 μm.

The active material may include a compound capable of reversibly intercalating and deintercalating lithium ions.

The active material may include a material capable of reversibly intercalating/deintercalating lithium ions, a lithium metal, a lithium metal alloy, a material being capable of doping and dedoping lithium, or a transition metal oxide.

At least one of the above and other features and advantages may also be realized by providing a rechargeable lithium battery including a negative electrode including a negative active material; a positive electrode including a positive active material; and a non-aqueous electrolyte, wherein at least one of the negative and positive active materials includes an active material, the active material including an active material core, and a thin film graphite layer on the core.

The thin film graphite layer may have a thickness of about 10 nm to about 2 μm.

The thin film graphite layer may include graphene.

The thin film graphite layer may be included in an amount of about 5 wt % or less, based on a total weight of the active material.

The thin film graphite layer may be included in an amount of about 0.1 wt % to about 5 wt %, based on a total weight of the active material.

The thin film graphite layer may include an oxygen-containing hydrophilic functional group, the oxygen-containing hydrophilic functional group being bound at a surface of the thin film graphite layer.

The oxygen containing functional group may include a carboxyl (COOH) group, a carbonyl (CO) group, a hydroxyl (OH) group, an aldehyde (CHO) group, a phenol group, a lactone group, an oxo group (O═) group, a carboxyl anhydride group, a peroxide group, or a combination thereof.

The active material may have an average particle diameter of about 5 μm to about 50 μm.

The active material may include a compound capable of reversibly intercalating and deintercalating lithium ions.

The active material may include a material capable of reversibly intercalating/deintercalating lithium ions, a lithium metal, a lithium metal alloy, a material being capable of doping and dedoping lithium, or a transition metal oxide.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
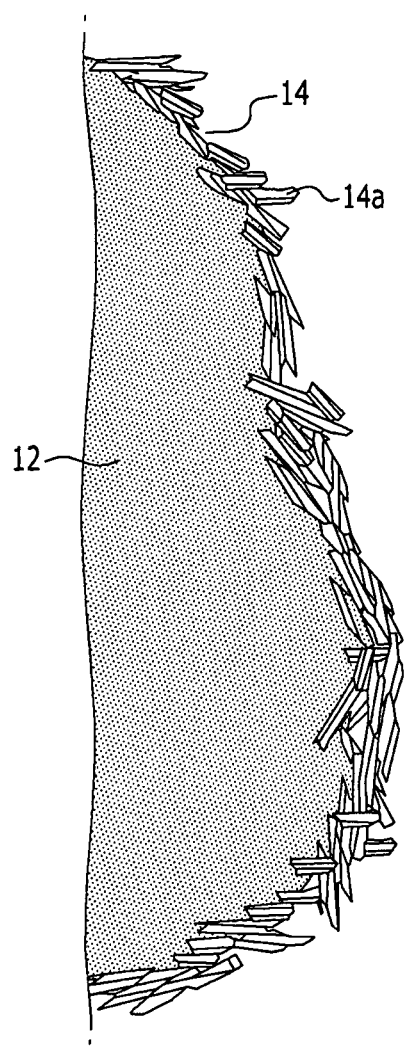
FIG. 1 illustrates a structure of a negative active material according to an embodiment.

Korean Patent Application No. 10-2010-0076616, filed on Aug. 9, 2010, in the Korean Intellectual Property Office, and entitled: "Active Material for Rechargeable Lithium Battery and Rechargeable Lithium Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

An active material for a rechargeable lithium battery according to an embodiment may include an active material core and a thin film graphite layer on the core.

The thin film graphite layer may include, e.g., a plate-shaped layer formed of a stacked structure of graphene sheets. Graphene is a two dimensional material formed of a graphite layer with a plate structure. For example, graphene is a one-atom thick layer of $sp^2$ bonded carbon atoms that are densely packed in a honeycomb crystal lattice. Thus, when a graphite layer includes a plate-shaped layer formed of a stacked structure of graphene sheets, ions may be more easily transferred on a surface of an active material and toward it, thereby decreasing charge transfer resistance. In addition, an active material particle may be uniformly dispersed in an active material slurry for an electrode and evenly covered with a binder thereon, thereby strengthening an electrode with excellent adhesion strength and also bringing about excellent electron transfer. In an implementation, the thin film graphite layer may be formed of, e.g., nanographene. The nanographene forming the thin film graphite layer may include a nanographene particle with an average particle size of about 5 nm to 500 nm in an amount of about 50 wt % or more, based on 100 wt % of the particle.

In contrast, if a fiber-type carbon layer is formed on the surface of an active material core, the active material may not easily deliver ions, despite the graphene structure. For example, a fiber-type carbon layer may be entangled among fibers on the surface of an active material core, thereby causing the active material slurry to agglomerate. In addition, a binder may not be uniformly attached on the surface of an active material, thereby deteriorating contact strength and thus ion transfer.

FIG. 1 illustrates a structure of a negative active material according to an embodiment. A negative active material 10 having such a structure according to an embodiment is partially illustrated in FIG. 1. As shown in FIG. 1, the negative active material 10 according to the present embodiment may include an active material core 12 and a thin film graphite layer 14 on the active material core 12. The thin film graphite layer 14 may include a graphene sheet 14*a*.

The thin film graphite layer coated on the active material core may have a thickness of about 10 nm to about 2 µm. Maintaining the thickness of the thin film graphite layer at about 10 nm to about 2 µm may help ensure that surface resistance of an active material is deteriorated and that lithium ions smoothly reach an interface of the active material. In an implementation, the thickness may be about 10 nm to about 1.5 µm.

The thin film graphite layer may be included in an amount of about 5 wt % or less, based on a total weight of the active material. Maintaining the amount of the thin film graphite layer at about 5 wt % or less may help ensure that ionic movement toward a surface of an active material is not resisted and that electronic conductivity is improved. In an implementation, the thin film graphite layer may be included in an amount of about 0.1 wt % to about 5 wt %.

The thin film graphite layer may include an oxygen containing hydrophilic functional group at a surface thereof. When a thin film graphite layer is formed on the active material, oxygen may be combined with the surface of the graphite layer in the oxidation process. As a result, the oxygen containing hydrophilic functional group may be combined or formed thereon. The oxygen containing hydrophilic functional group may include, e.g., a carboxyl (COOH) group, a carbonyl (CO) group, a hydroxyl (OH) group, an aldehyde (CHO) group, a phenol group, a lactone group, an oxo (O=) group, a carboxyl anhydride group, a peroxide group, or a combination thereof.

For example, the oxygen containing functional group may be combined on the surface of the thin film graphite layer. Thus, the active material may have high affinity to water without a particular or additional surfactant and may maintain a colloid shape in which particles are uniformly dispersed due to repulsion among themselves.

The active material including the core and the thin film graphite layer thereon may have an average particle diameter of about 1 µm to about 50 µm. In an implementation, the average particle diameter may be about 3 µm to about 30 µm.

The active material may be used for or included in at least one of a positive and a negative electrode. When the active material prepared according to the present embodiment is used for a positive electrode, the active material core may include a compound that reversibly intercalates/deintercalates lithium ions, e.g., is capable of reversibly intercalating/deintercalating lithium ions.

For example, the compound that reversibly intercalate and deintercalate lithium ions may include $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); or $LiFePO_4$. In the above formulae, A may include Ni, Co, Mn, or a combination thereof; X may include Al, Ni, Co, Mn, Cr, Fe, Mg, Sr, V, a rare earth element, or a combination thereof; D may include O, F, S, P, or a combination thereof; E may include Co, Mn, or a combination thereof; T may include F, S, P, or a combination thereof; G may include Al, Cr, Mn, Fe, Mg, La, Ce, Sr, V, or a combination thereof; Q may include Ti, Mo, Mn, or a combination thereof; Z may include Cr, V, Fe, Sc, Y, or a combination thereof; and J may include V, Cr, Mn, Co, Ni, Cu, or a combination thereof.

When the active material according to the present embodiment is used for a negative electrode, the active material core may include a material that reversibly intercalates/deintercalates lithium ions, e.g., capable of reversibly intercalating/deintercalating lithium ions, a lithium metal, a lithium metal alloy, a material being capable of doping and dedoping lithium, or a transition metal oxide.

The material that reversibly intercalates/deintercalates lithium ions may include a carbon-based material. The carbon-based material include, e.g., crystalline carbon, amorphous carbon, and a mixture thereof. The crystalline carbon may be, e.g., non-shaped, sheet, flake, spherical, or fiber shaped natural graphite or artificial graphite. The amorphous carbon may be, e.g., a soft carbon (carbon obtained through sintering at a low temperature), a hard carbon (carbon obtained through sintering at a high temperature), mesophase pitch carbide, fired coke, and the like.

For example, the material being capable of doping and dedoping lithium may include Si, $SiO_x$ (0<x<2), a Si-Q alloy (where Q is an element including at least one of an alkaline metal, an alkaline-earth metal, a group 13 element, a group 14 element, a transition element, a rare earth element, and combinations thereof, and is not Si), Sn, $SnO_2$, a Sn—R alloy (where R is an element including at least one of an alkaline metal, an alkaline-earth metal, a group 13 element, a group 14 element, a transition element, a rare earth element, and combinations thereof, and is not Sn), and mixtures thereof. At least one of these materials may be mixed with $SiO_2$. The elements Q and R may each independently be, e.g., Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide may include vanadium oxide, lithium vanadium oxide of the following Chemical Formula 1 or 2, or lithium titanium oxide of the following Chemical Formula 3.

$$Li_{x1}V_{y1}M_{d1}O_{2+e1}$$ [Chemical Formula 1]

In Chemical Formula 1, $1 \le x1 \le 2.5$, $0.5 \le y1 \le 1.5$, $0 \le d1 \le 0.5$, $0 \le e1 \le 0.5$, and M may include Mg, Al, Cr, Mo, Ti, W, Zr, Si, Sc, Cu, Nb, Y, or a combination thereof.

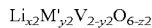
$$Li_{x2}M'_{y2}V_{2-y2}O_{6-z2}$$ [Chemical Formula 2]

In Chemical Formula 2, $0 \le x2 \le 1.2$, $0 \le y2 \le 2$, $-2 \le z2 \le 2$, and M' may include Mo, Mn, Co, Ni, or a combination thereof.

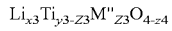
$$Li_{x3}Ti_{y3-z3}M''_{z3}O_{4-z4}$$ [Chemical Formula 3]

In Chemical Formula 3, $0.6 \le x3 \le 2.5$, $1.2 \le y3 \le 2.3$, $0 \le z3 \le 0.5$, $0 \le z4 \le 0.5$, and M'' may include V, Cr, Nb, Fe, Ni, Co, Mn, W, Al, Ga, or a combination thereof.

According to an embodiment, an active material for a rechargeable lithium battery may be prepared in the following process. First, an active material may be added to a graphene solution. The active material may be mixed with graphene in a ratio of about 99.5:0.5 wt % to about 90:10 wt %. For example, a concentration of the graphene solution may be controlled to have the above mixing ratio of the active material and graphene. The graphene solution may include a solvent, e.g., water, alcohol, acetone, or a combination thereof. The alcohol may include, e.g., methanol, ethanol, propanol, butanol, or a combination thereof.

The graphene may be prepared by using graphite in a common method or may be commercially available. In addition, the graphene may be ground to have an average size of about 10 nm to about 500 nm.

Next, acid may be added to the solution to adjust a pH thereof. The acid may include, e.g., oxalic acid, acetic acid, sulfuric acid, nitric acid, hydrochloric acid, or a combination thereof. The acid may be added to the solution to achieve a pH of about 2 to about 6.

The graphene may have a plate shape and may be combined with the oxygen containing hydrophilic functional group on an edge of the plate during the above described oxidation treatment. The oxygen containing hydrophilic functional group may form a hydrogen bond with water. Thus, the graphene including the oxygen containing hydrophilic functional group may have a high affinity to a hydrophilic solvent, e.g., water, with no additional surfactant and may maintain a colloid shape in which particles are uniformly dispersed due to repulsion among themselves.

The oxygen containing hydrophilic functional group may include, e.g., a carboxyl (COOH) group, a carbonyl (CO) group, a hydroxyl (OH) group, an aldehyde (CHO) group, a phenol group, a lactone group, an oxo (O=) group, a carboxyl anhydride group, a peroxide group, or a combination thereof.

Thus, the graphene may be acid-treated and combined with the oxygen containing hydrophilic functional group on the surface thereof. The graphene may be coated on a surface of a lithium composite compound by way of the oxygen containing hydrophilic functional group. The prepared product may be washed and dried by a suitable process, thereby preparing an active material for a rechargeable lithium battery.

For example, when graphene in the solution is electrically neutral but has a zeta potential reaching an isoelectric point by adjusting pH, particles may have less repulsive force but new Van der Waals power. Thus, the particles may be agglomerated with one another. There may be an agglomeration reaction in which a plate-shaped graphite layer, e.g., graphene, may be stuck to a surface of a huge particle such as a lithium composite compound with a strong bond with no particular or additional binder.

The acquired product after adding acid may be dried to remove, e.g., moisture, a functional group, or the like. The drying process may be performed at a temperature of about 100° C. to 300° C. for predetermined times.

The negative active material may not be heat-treated at a high temperature of about 800° C. to 1200° C. Thus, an oxide may not have an unstable structure that may result from heat treatment at a high temperature. In general, an oxide may not be reduced under a carbon atmosphere by heat-treating at a high temperature. Thus, when the oxide is coated and heat-treated with a carbon precursor on a surface thereof, it may be heat-treated to improve conductivity of carbon, but the heat-treatment may destabilize an oxide structure.

The active material may have higher electric-conductivity on its surface due to a plate-shaped graphite coating layer. Accordingly, interface resistance may decrease and a sufficient electrical network may be formed inside an electrode when lithium ions come in and go out, thereby achieving high input and output and suppressing electrode degradation during high rate charge and discharge.

According to another embodiment, a rechargeable lithium battery may include a negative electrode including a negative active material, a positive electrode including a positive active material, and a non-aqueous electrolyte.

At least one of the negative and positive active materials may include the active material of the previous embodiment.

The negative electrode may include a negative active material layer including the negative active material and a current collector supporting the negative active material layer. The negative active material layer may include the negative active material in an amount of about 95 to about 98 wt %, based on at total weight of the negative active material layer.

The negative active material layer may include a binder. The binder may be included in an amount of about 1 wt % to about 5 wt %, based on a total weight of the negative active material layer. In an implementation, the negative active material layer may include a conductive material. When the negative active material layer includes the conductive material, it may include about 90 wt % to about 98 wt % of the negative active material, about 1 wt % to about 5 wt % of the binder, and about 1 wt % to about 5 wt % of the conductive material.

The binder may improve properties for binding negative active material particles to one another and with the current collector. The binder may include, e.g., a non-water-soluble binder, a water-soluble binder, or a combination thereof.

The non-water-soluble binder may include, e.g., polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and a combination thereof.

The water-soluble binder may include, e.g., a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound may include one or more of carboxylmethyl cellulose, hydroxypropylmethyl cellulose, methyl cellulose, or alkaline metal salts thereof. The alkaline metal may include, e.g., sodium (Na), potassium (K), or lithium (Li). The cellulose-based compound may be included in an amount of about 0.1 to about 3 parts by weight, based on 100 parts by weight of the binder.

The current collector may include, e.g., a copper foil, a nickel foil, a stainless steel foil, a titanium foil, a nickel foam, a copper foam, a polymer substrate coated with a conductive metal, or combinations thereof.

The positive electrode may include a positive active material layer including a positive active material and a current collector supporting the positive active material layer.

The positive active material layer may include the positive active material in an amount of about 90 to about 98 wt %, based on an entire weight of the positive active material layer.

The positive active material layer may include a binder and a conductive material. The binder and the conductive material may be included in an amount of about 1 wt % to about 5 wt %, based on the entire weight of the positive active material layer.

The binder may improve properties for binding the positive active material particles to one another and with a current collector. The binder may include, e.g., polyvinyl alcohol, carboxylmethyl cellulose, hydroxypropyl cellulose, diacetyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The current collector may include, e.g., aluminum (Al) foil, but is not limited thereto.

The active material may exhibit good conductivity when the active material of an embodiment is used for the positive electrode and/or the negative electrode. thus, a conductive material may not be needed. However, in order to improve conductivity of the electrode, a suitable conductive material may be added.

The conductive material may include any suitable conductive material that is generally used for a rechargeable lithium battery. For example, the conductive material may include a carbon-based material such as natural graphite, artificial graphite, carbon black, acetylene black, ketjen black, carbon fiber, and the like; a metal-based material including a metal powder or a metal fiber including copper, nickel, aluminum, silver, and the like; a conductive polymer such as a polyphenylene derivative and the like; or a mixture thereof.

When the active material of an embodiment is not used for one of the positive electrode and the negative electrode, the lithium composite compound described above may be used instead of an active material The negative and positive electrodes may be fabricated in a method including mixing the active material and a binder to provide an active material composition, and then coating the composition on a current collector followed by drying and compressing the resultant structure. In an implementation, the negative and positive electrodes may be fabricated in a method including mixing the active material, binder, and conductive material to provide an active material composition, and coating the composition on a current collector followed by drying and compressing the resultant structure. The solvent may include, e.g., N-methylpyrrolidone and the like, but is not limited thereto. The electrode-manufacturing method is well known and thus is not described in detail in the present specification.

The non-aqueous electrolyte may include a non-aqueous organic solvent and a lithium salt.

The non-aqueous organic solvent may serve as a medium for transmitting ions taking part in the electrochemical reaction of a battery.

The non-aqueous organic solvent may include, e.g., a carbonate-based, ester-based, ether-based, ketone-based, alcohol-based, or aprotic solvent. The carbonate-based solvent may include, e.g., dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include, e.g., methyl acetate, ethyl acetate, n-propyl acetate, dimethyl acetate, methylpropionate, ethylpropionate, γ-butyrolactone, decanolide, valerolactone, mevalonolactone, caprolactone, or the like. The ether-based solvent may include, e.g., dibutyl ether, tetraglyme, diglyme, dimethoxyethane, 2-methyltetrahydrofuran, tetrahydrofuran, or the like, and examples of the ketone-based solvent include cyclohexanone or the like. The alcohol-based solvent may include, e.g., ethyl alcohol, isopropyl alcohol, and the like. The aprotic solvent may include, e.g., nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture thereof. When the organic solvent is used in a mixture, a mixing ratio may be controlled in accordance with a desirable battery performance.

The carbonate-based solvent may include a mixture of a cyclic carbonate and a linear or chain carbonate. The cyclic carbonate and the chain carbonate may be mixed together in a volume ratio of about 1:1 to about 1:9. When the mixture is used as an electrolyte, the electrolyte performance may be enhanced.

In addition, the non-aqueous organic electrolyte may further include a mixture of a carbonate-based solvent and an aromatic hydrocarbon-based solvent. The carbonate-based solvent and the aromatic hydrocarbon-based solvent may be mixed together in a volume ratio of about 1:1 to about 30:1.

The aromatic hydrocarbon-based organic solvent may be represented by the following Chemical Formula 4.

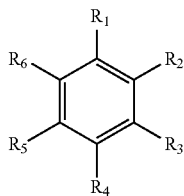

[Chemical Formula 4]

In Chemical Formula 4, $R_1$ to $R_6$ may each independently be hydrogen, a halogen, a C1 to C 10 alkyl group, a C1 to C10 haloalkyl group, and a combination thereof.

The aromatic hydrocarbon-based organic solvent may include, e.g., at least one of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or combinations thereof.

The non-aqueous electrolyte may further include an additive including, e.g., vinylene carbonate, an ethylene carbonate-based compound of the following Chemical Formula 5, or a combination thereof, in order to improve cycle life of a battery.

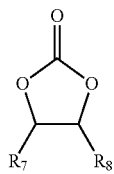

[Chemical Formula 5]

In Chemical Formula 5, $R_7$ and $R_8$ may each independently be hydrogen, a halogen, a cyano group (CN), a nitro group ($NO_2$), and a C1 to C5 fluoroalkyl group, provided that at least one of $R_7$ and $R_8$ includes a halogen, a cyano group (CN), a nitro group ($NO_2$), and a C1 to C5 fluoroalkyl group, and that both $R_7$ and $R_8$ are not hydrogen.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. An amount of the additive for improving cycle life may be adjusted within an appropriate range.

The lithium salt may be dissolved in an organic solvent, may supply lithium ions in the battery, may facilitate basic operation of a rechargeable lithium battery, and may improve lithium ion transport between positive and negative electrodes. The lithium salt may include at least one supporting salt including, e.g., $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and LiB$(C_2O_4)_2$ (lithium bisoxalato borate, LiBOB). The lithium salt may be used in a concentration of about 0.1 M to about 2.0 M. Maintaining the concentration of the lithium salt at about 0.1 M to about 2.0 M may help ensure that electrolyte performance and lithium ion mobility are enhanced due to optimal electrolyte conductivity and viscosity.

Figure 2:
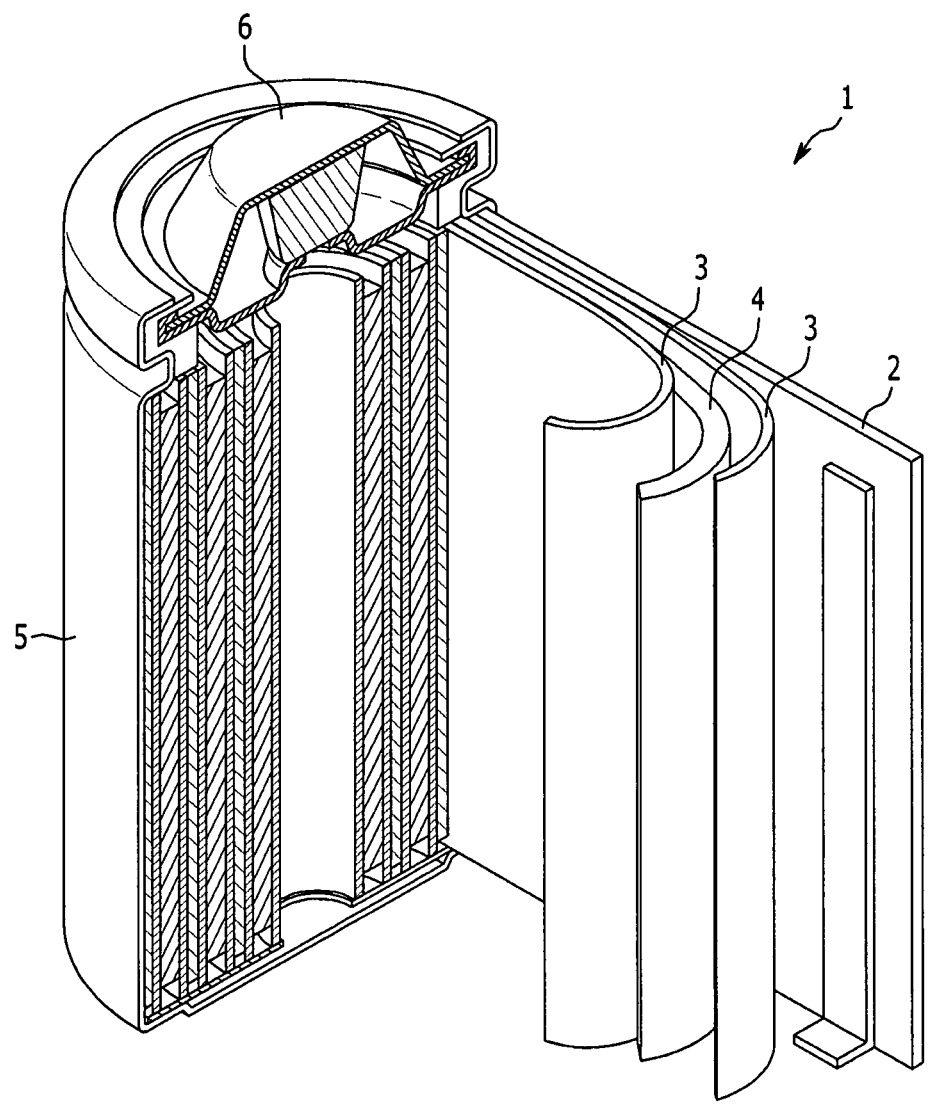
FIG. 2 illustrates a structure of a rechargeable lithium battery according to an embodiment.

FIG. 2 illustrates a structure of a rechargeable lithium battery according to an embodiment. As shown in FIG. 2, the rechargeable lithium battery 1 may include a battery case 5 including a positive electrode 4, a negative electrode 2, and a separator 3 interposed between the positive electrode 4 and the negative electrode 2, an electrolyte solution (not illustrated) impregnated therein, and a sealing member 6 sealing the battery case 5.

Examples of suitable separator materials may include polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

The following examples illustrate the embodiments in more detail. These examples, however, are not in any sense to be interpreted as limiting the scope of this disclosure.

Example 1

Natural graphite powder with an average diameter of about 1 mm was deposited for 72 hours in a mixture of concentrated sulfuric acid (98 wt % concentration) and nitric acid (63 wt % concentration) mixed in a volume ratio of 1:3. The sulfuric acid penetrated between interlayer structures of the graphite. After the reaction, the mixture of acid and graphite was filtrated. The filtrated result was washed with pure water until it achieved a neutral pH. The washed product was sufficiently dried in a 120° C. oven to remove moisture, and compressed into a long rod shape.

The rod structure was wrapped with a metal net. The resulting product was used as one electrode in an electrolytic bath with pure water therein, while a copper rod was used as a counter electrode. Then, it was allowed to stand for more than one day so that the oxidized graphite electrode might sufficiently absorb moisture among fine gaps. Current was applied to the two electrodes and simultaneously subjected to an ultrasonic wave for 48 hours. The oxidized graphite electrode was completely oxidized and ground due to a grinding operation of the ultrasonic wave and application of the current. After the reaction, the oxidized graphite graphene powder was dispersed in a pure solvent.

The prepared product was filtrated and washed with pure water, until it achieved a neutral pH. The resulting product was re-dispersed into pure water, preparing a graphene solution in which nanographene was dispersed in a pure solution. The graphene had an average size of about 20 nm.

Example 2

About 20 g of $LiCoO_2$ was added to 10 g of the graphene solution prepared according to Example 1. Next, oxalic acid in an appropriate amount was added to this mixture to adjust its pH to be 4 or less, so that nanographene was absorbed and coated on the surface of $LiCoO_2$. The product was filtrated and washed with pure water and then dried in a 120° C. oven, preparing a $LiCoO_2$ positive active material having a graphene coating layer on the surface. The graphene coating layer was 500 nm thick and coated in an amount of 1 wt %, based on the entire weight of a positive active material. The positive active material had an average particle diameter of about 20 μm.

Next, 94 wt % of the positive active material was mixed with 1 wt % of a carbon black conductive material and 5 wt % of a polyvinylidene fluoride binder in an N-methylpyrrolidone solvent, preparing a positive active material composition. The positive active material composition was coated on an Al foil and dried and compressed using known methods, thereby fabricating a positive electrode. The positive electrode had an active mass density of about 3.8 g/cc.

Example 3

About 20 g of soft carbon was added to about 10 g of the nanographene solution prepared according to Example 1. Next, oxalic acid in an appropriate amount was added to the mixture to adjust its pH to be 4 or less, so that nanographene was absorbed and coated on the surface of neutral soft carbon. The product was filtrated and washed with pure water and then dried in a 120° C. oven, preparing a soft carbon negative active material having a nanographene coating layer on a surface thereof. The nanographene coating layer was 500 nm thick and coated in an amount of about of 1 wt % based on the entire weight of the negative active material. The negative active material had an average particle diameter of about 15 μm.

Then, 93 wt % of the negative active material was mixed with 1 wt % of a carbon black conductive material and 5 wt % of a polyvinylidene fluoride binder in an N-methylpyrrolidone solvent, preparing a negative active material composition. This negative active material composition was coated on an Al current collector and then dried and compressed using known methods, fabricating a negative electrode. The negative electrode had an active mass density of about 1.3 g/cc.

Example 4

About of 20 g of $LiCoO_2$ was added to 10 g of the graphene solution prepared according to Example 1. Next, oxalic acid in an appropriate amount was added to this mixture to adjust its pH to be 4 or less, so that nanographene was adsorbed and coated on the surface of the neutral $LiCoO_2$. The product was filtrated and washed with pure water, and then dried in a 120° C. oven.

About 20 g of the dried product was added to 10 g of the graphene solution and then dried, and the addition and drying steps were repeated for 19 times. In other words, the coating and drying processes was performed 20 times, preparing a $LiCoO_2$ positive active material having a graphene coating layer on the surface. The graphene coating layer was 1 μm thick. The graphene was coated in an amount of about 5 wt %, based on the entire weight of the positive active material. The positive active material had an average particle diameter of about 20.5 μm.

Comparative Example 1

About 92 wt % of $LiCoO_2$ positive active material was mixed with 3 wt % of a carbon black conductive material and 5 wt % of a polyvinylidene fluoride binder in an N-methylpyrrolidone solvent, preparing a positive active material composition. This positive active material composition was coated on an Al current collector and then dried and compressed, fabricating a positive electrode using known methods. The positive electrode had an active mass density of about 3.8 g/cc.

Comparative Example 2

About 92 wt % of a soft carbon negative active material was mixed with 3 wt % of a carbon black conductive material and 5 wt % of a polyvinylidene fluoride binder in an N-methylpyrrolidone solvent, preparing a negative active material composition. This negative active material composition was coated on an Al current collector and then dried and compressed, fabricating a negative electrode using known methods. The negative electrode had an active mass density of about 1.3 g/cc.

Comparative Example 3

About 100 g of $LiCoO_2$ was added to coal-based pitch dissolved in toluene (pitch: 10 g, toluene 300 ml). This mixture was heat-treated at 900° C. under a nitrogen inert atmosphere, thereby preparing a positive active material having an amorphous carbon layer on the surface. The carbon layer was about 3 μm thick.

Next, about 92 wt % of the positive active material was mixed with 3 wt % of a carbon black conductive material and 5 wt % of a polyvinylidene fluoride binder in an N-methylpyrrolidone solvent, preparing a positive active material composition. This positive active material composition was coated on an Al current collector and then dried and compressed, fabricating a positive electrode using known methods. The positive electrode had an active mass density of about 3.8 g/cc.

Evaluation

The positive and negative electrodes according to Examples 2 to 4 and Comparative Examples 1 to 3 were respectively used with a lithium metal as a counter electrode, fabricating a coin-type half-cell. An electrolyte solution was prepared by dissolving 1 M $LiPF_6$ in a mixed solventent of ethylene carbonate, dimethyl carbonate, and diethyl carbonate in a volume ratio of 2:3:5.

The half-cells of Examples 2 and 4 and Comparative Examples 1 and 3 were charged and discharged at 0.2 C under a cut-off charge of 4.2 V and a cut-off discharge condition of 3.0 V. In addition, the half-cells according to Examples 3 and Comparative Example 2 were charged and discharged at 0.2 C under a cut-off charge of 1.5 V and a cut-off discharge condition of 0.1 V.

The half-cells were charged and discharged once under the above charge and discharge conditions and measured regarding discharge capacity. The results are provided in the following Table 1 as 0.2 C capacity. The charge and discharge capacities were used to calculate charge and discharge efficiency. The results are provided in the following Table 1 as 0.2 C efficiency.

In addition, while charge and discharge rates were respectively 1 C, 5 C, 20 C, and 50 C, the half-cells were charged and discharged. Each charge and discharge capacity percentage at 5 C, 20 C, and 50 C against 1 C was calculated and provided in the following Table 1 as charge and discharge characteristics. In addition, the half-cells were charged and discharged 500 times at 30 C, and then a percentage of the discharge capacity at 500th charge and discharge against the discharge capacity at the 1st charge and discharge was calculated. The results are provided in the following Table 1 as cycle life characteristic.

TABLE 1

|  | 0.2C capacity (mAh/g) | 0.2C efficiency (%) | Charge characteristic (%) | | | Discharge characteristic | | | 30C cycle-life (%) |
| --- | --- | --- | --- | --- | --- | --- | --- | --- | --- |
|  |  |  | 5C/1C | 20C/1C | 50C/1C | 5C/1C | 20C/1C | 50C/1C |  |
| Example 2 | 148 | 96 | 80 | 57 | 37 | 94 | 76 | 52 | 85 |
| Example 3 | 248 | 82 | 85 | 63 | 37 | 96 | 79 | 67 | 82 |
| Example 4 | 147 | 95 | 79 | 55 | 36 | 92 | 74 | 50 | 85 |
| Comparative Example 1 | 145 | 95 | 78 | 43 | 18 | 90 | 58 | 47 | 34 |
| Comparative Example 2 | 237 | 79 | 75 | 46 | 19 | 94 | 61 | 52 | 41 |
| Comparative Example 3 | 142 | 96 | 70 | 43 | 36 | 90 | 67 | 43 | 43 |

As shown in Table 1, a half-cell respectively including an active material according to Examples 2 to 4 exhibited improved high rate charge and discharge characteristics. The half-cells of Comparative Examples 1 to 3 exhibited deteriorated high rate charge and discharge characteristics, and particularly deteriorated high rate charge characteristics.

Without being bound by theory, it is believed that the reason is that the electrodes of Examples 2 to 4 included 1 wt % of a conductive material in a small amount but had high conductivity on the surface of an active material of Example 3 and thus had an interface resistance decrease when lithium ions entered and exited, bringing about excellent high rate charge and discharge characteristics. In addition, they had a high active mass density and low pore rate inside the substrate.

The electrodes of Examples 2 to 4 included a conductive material in a small amount, but had a sufficient ion transfer path due to a graphene coating layer on the surface. Very little of the conductive material was included. Thus, the electrodes might have pores among active material particles. Accordingly, an electrolyte solution might permeate the pores, through which ions could be better delivered. Accordingly, the half-cells according to Examples 2 to 4 exhibited relatively high initial capacity and efficiency, even though they had a high density.

In contrast, the half-cells of Comparative Example 1 and 2 included positive and negative electrodes with an insufficient conductivity path and thus had greater resistance as the rate is higher, thereby deteriorating charge and discharge efficiency. In addition, since the half-cell of Comparative Example 3 included too thick a carbon layer, lithium ions might have resistance until reaching the surface of an active material, deteriorating the charge and discharge characteristics at a high rate.

The half-cells of Examples 2 to 4 exhibited an excellent cycle life characteristic of more than 82%. A conductive path might be deteriorated due to rapid contraction/expansion on the interface of an active material due to rapid charge and discharge at a high rate. However, lithium ions were smoothly delivered due to a graphene coating layer on the surface.

In contrast, the half-cells of Comparative Examples 1 and 2 had a rapidly deteriorated conductive path due to rapid contraction/expansion on the interface of an active material because of rapid charge and discharge at a high rate and thus unsmooth ion transfer, having a significantly deteriorated cycle life characteristic. Furthermore, the half-cell of Comparative Example 3 had so thick a carbon layer that lithium ions might have resistance in reaching the surface of an active material, deteriorating the high rate cycle life characteristic.

The embodiments provide an active material for a rechargeable lithium battery having excellent conductivity and excellent high power characteristics.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An active material for a rechargeable lithium battery including active material particles, the active material particles comprising:
   an active material particle core; and
   a thin film graphite layer covering an outer surface of the particle core, the thin film graphite layer including stacked graphene sheets,
   wherein the thin film graphite layer including stacked graphene sheets has a thickness of about 10 nm to about 2 μm.

2. The active material as claimed in claim 1, wherein the thin film graphite layer is included in an amount of about 5 wt % or less, based on a total weight of the active material.

3. The active material as claimed in claim 1, wherein the thin film graphite layer is included in an amount of about 0.1 wt % to about 5 wt %, based on a total weight of the active material.

4. The active material as claimed in claim 1, wherein the thin film graphite layer includes an oxygen containing hydrophilic functional group, the oxygen containing hydrophilic functional group being bound at a surface of the thin film graphite layer.

5. The active material as claimed in claim 4, wherein the oxygen containing hydrophilic functional group includes a carboxyl (COOH) group, a carbonyl (CO) group, a hydroxyl (OH) group, an aldehyde (CHO) group, a phenol group, a lactone group, an oxo group (O=) group, a carboxyl anhydride group, a peroxide group, or a combination thereof.

6. The active material as claimed in claim 1, wherein the active material particles have an average particle diameter of about 5 μm to about 50 μm.

7. The active material as claimed in claim 1, wherein the active material includes a compound capable of reversibly intercalating and deintercalating lithium ions.

8. The active material as claimed in claim 1, wherein the active material includes a material capable of reversibly intercalating/deintercalating lithium ions, a lithium metal, a lithium metal alloy, a material being capable of doping and dedoping lithium, or a transition metal oxide.

9. The active material as claimed in claim 1, wherein the thin film graphite layer continuously covers the particle core.

10. A rechargeable lithium battery, comprising:
a negative electrode including a negative active material;
a positive electrode including a positive active material; and
a non-aqueous electrolyte,
wherein at least one of the negative and positive active materials includes active material particles, the active material particles including:
an active material particle core, and
a thin film graphite layer covering the particle core, the thin film graphite layer consisting of graphene sheets and having a thickness of about 10 nm to about 2 μm.

11. The rechargeable lithium battery as claimed in claim 10, wherein the thin film graphite layer is included in an amount of about 5 wt % or less, based on a total weight of the active material.

12. The rechargeable lithium battery as claimed in claim 10, wherein the thin film graphite layer is included in an amount of about 0.1 wt % to about 5 wt %, based on a total weight of the active material.

13. The rechargeable lithium battery as claimed in claim 10, wherein the thin film graphite layer includes an oxygen-containing hydrophilic functional group, the oxygen-containing hydrophilic functional group being bound at a surface of the thin film graphite layer.

14. The rechargeable lithium battery as claimed in claim 13, wherein the oxygen containing functional group includes a carboxyl (COOH) group, a carbonyl (CO) group, a hydroxyl (OH) group, an aldehyde (CHO) group, a phenol group, a lactone group, an oxo group (O=) group, a carboxyl anhydride group, a peroxide group, or a combination thereof.

15. The rechargeable lithium battery as claimed in claim 10, wherein the active material particles have an average particle diameter of about 5 μm to about 50 μm.

16. The rechargeable lithium battery as claimed in claim 10, wherein the active material includes a compound capable of reversibly intercalating and deintercalating lithium ions.

17. The rechargeable lithium battery as claimed in claim 10, wherein the active material includes a material capable of reversibly intercalating/deintercalating lithium ions, a lithium metal, a lithium metal alloy, a material being capable of doping and dedoping lithium, or a transition metal oxide.

18. The rechargeable lithium battery as claimed in claim 10, wherein the thin film graphite layer continuously covers the particle core.

19. An active material for a rechargeable lithium battery including active material particles, the active material particles comprising:
an active material particle core; and
a thin film graphite layer completely covering the particle core, the thin film graphite layer including graphene sheets,
wherein the thin film graphite layer including graphene sheets has a thickness of about 10 nm to about 2 μm.

* * * * *